Nov. 6, 1962 E. BANIA 3,062,024
UNIVERSAL JOINT
Filed Sept. 25, 1961

INVENTOR.
EDWARD BANIA.
BY
J.S. Murray
ATTORNEY

United States Patent Office 3,062,024
Patented Nov. 6, 1962

3,062,024
UNIVERSAL JOINT
Edward Bania, 8933 Ohio, Detroit 4, Mich.
Filed Sept. 25, 1961, Ser. No. 140,604
4 Claims. (Cl. 64—7)

This invention relates to universal joints for transmitting drives and particularly relates to joints of a ball and socket type.

An object of the invention is to provide a simplified ball and socket joint in which a drive is transmitted through a pin rigidly carried by the socket member and extending diametrically through the spherical socket of such member, the ball member having a central cavity and being slotted at opposite sides of such cavity to accommodate the pin, while affording an angular relative oscillation of the ball and socket member requisite to the desired drive.

Another object is to adapt the aforementioned pin to shear responsive to a predetermined overload, thereby minimizing resultant damage.

Another object is to rotatively set into said central cavity of the ball member a relatively small ball diametrically apertured to receive the mid portion of said pin, thus reinforcing the pin and assisting in transmitting a drive.

Another object is to form the ball member with a radial opening extending from the peripheral face of such member to said spherical cavity and proportioned to allow insertion in said cavity of the relatively small ball, in assembling the joint.

Another object is to close said radial opening by fitting a filler block therein after effecting the desired central location of the small ball in the ball member, said filler block having inner and outer end faces respectively engaging and conforming to the small ball and the spherical face of the socket.

Another object is to form the socket member in two parts wherein complementary halves of the socket are formed, and to provide fastenings to clamp said parts in their complementary relation and for further clamping between said parts the end portions of the drive-transmitting pin.

These and various other objects are attained by the construction herein described and illustrated in the accompanying drawing, wherein.

Figure 1:
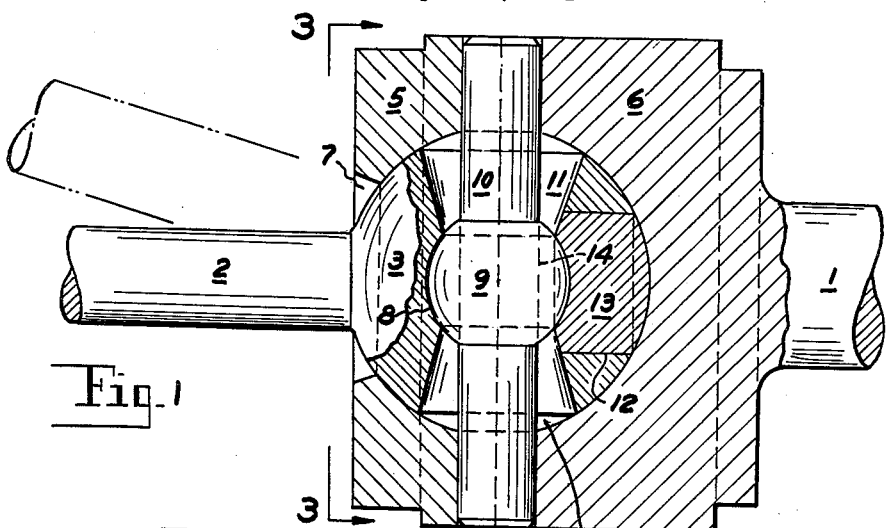
FIG. 1 is a sectional view of the joint taken on the line 1—1 of FIG. 3, the driving and driven shafts being shown with their axes aligned.
Figure 2:
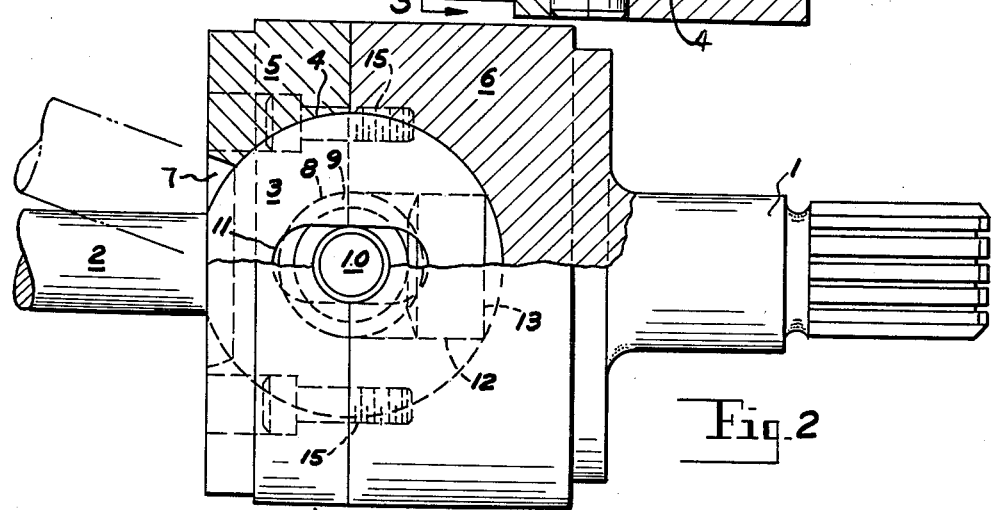
FIG. 2 is a side view of the joint, partially in section on the line 2—2 of FIG. 3.
Figure 3:
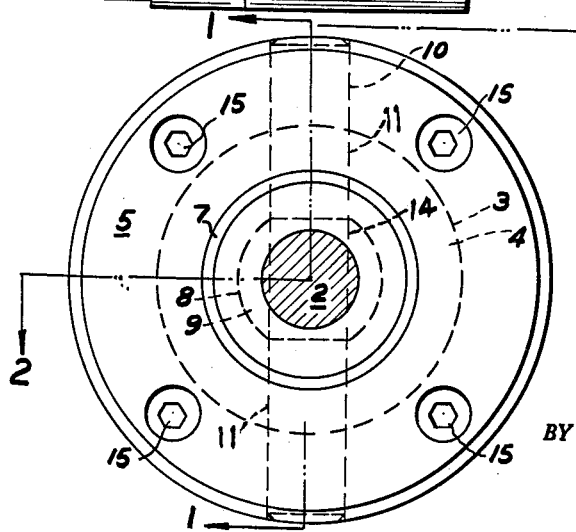
FIG. 3 is an end view of the joint, partially in section on the line 3—3 of FIG. 1.

In these views, the reference characters 1 and 2 designate two shafts, one driving the other, the driven shaft 2 having an angular divergency to the other shaft as best appears in FIG. 1. However, the driving and driven relation of these shafts may be reversed, when and if desired. The shaft 2 has a terminal enlargement forming a ball member 3 slip-fitted in a spherical socket 4, complementary halves of which are formed respectively in abutting parts 5 and 6 of a socket member, which may be substantially rectangular, as illustrated. To accommodate the shaft 2 and afford it a required universal angular play, the part 5 has a circular opening 7 extending to the socket 4 from an end face of said part. The ball member 3 is formed centrally thereof with a spherical cavity 8 in which a relatively small ball 9 is slip-fitted. For transmitting a drive, a pin 10, transverse to the shaft 1, is rigidly installed in the socket member and extends between opposite side faces of such member, passing diametrically through the socket 4. To accommodate said pin, the ball member is formed with a pair of duplicate opposed slots 11 each having parallel side faces, and having end faces converging toward the center of said member. Thus the socket member together with the pin 10 is afforded a requisite angular play relative to the ball member 3. Said slots conform in width to the pin diameter, avoiding lost motion in the direction of drive.

To provide for insertion of the ball 9 to its central position in the ball member 3, the latter is formed with a circular opening 12 accommodating the ball 9 and extending from the periphery of said member to the spherical cavity wherein said ball requires installation. It is preferred, in the course of assembling the joint, to insert a filler block 13 in the opening 12, such block having a concave inner end engaging the previously installed ball 9 and having a spherically convex outer end seating against the wall of the socket 4. The ball 9 has a diametrical cylindrical opening 14 into which the mid portion of the pin 10 is slip-fitted.

The parts 5 and 6 of the socket member are rigidly interconnected and maintained in their complementary relation by a plurality of screws 15, which further serve to rigidly clamp the pin 10 in its operative position between said parts, the meeting faces of said parts being grooved to fit the pin.

The described joint, in transmitting an applied drive at uniform velocity maintains uniformity and minimizes any frictional power loss. The pin 10 may be designed to transmit a certain maximum of power. In event of a predetermined overload, the pin will shear within the slot 11, thus interrupting the drive. Replacement of the pin will then suffice to restore a satisfactory operation of the joint.

In assembling the joint, it is of course necessary to first pass the ball 9 through the opening 12 to introduce the ball into the cavity 8. The filler block 13 is then slipped into said opening, and the pin 10 is then put in place. Assembly is completed by applying the parts forming the socket member and then applying the screws 15.

What I claim is:

1. A universal joint comprising a member formed with a spherical socket, a ball member pivotally fitted in said socket and formed with a central spherical cavity, a ball fitted rotatively in said cavity, and a pin extending through the ball and ball member diametrically thereof and having end portions outwardly projecting from the ball member and fixed in the socket member, the ball member being slotted inwardly from its periphery to the central cavity to accommodate said pin whereby the socket member and pin may swing in unison relative to the ball member.

2. A universal joint as set forth in claim 1, the ball member having a circular opening extending from its periphery to said spherical cavity to permit insertion of said ball in the cavity.

3. In a universal joint as set forth in claim 2, a filler block fitted in said opening, and having an inner end face seating against said ball and an outer face seating against the periphery of said socket.

4. A universal joint as set forth in claim 1, the socket member comprising two parts, formed with complementary halves of said socket, and means rigidly interconnecting said parts and maintaining therein a complementary relation, said means further clamping the pin between said socket-forming parts.

References Cited in the file of this patent

UNITED STATES PATENTS

| | | |
|---|---|---|
| 1,357,843 | Cashman | Nov. 2, 1920 |
| 1,933,494 | Chilton | Oct. 31, 1933 |
| 2,687,024 | George | Aug. 24, 1954 |

FOREIGN PATENTS

| | | |
|---|---|---|
| 164,839 | Great Britain | June 15, 1921 |
| 690,610 | Germany | Apr. 30, 1940 |